United States Patent [19]

Morisawa

[11] Patent Number: 5,062,019

[45] Date of Patent: * Oct. 29, 1991

[54] METHOD AND APPARATUS FOR ACCURATELY POSITIONING A MAGNETIC RECORDING AND REPRODUCING HEAD

[75] Inventor: Tahei Morisawa, Tokyo, Japan

[73] Assignee: Asahi Kogaku Kogyo Kabushiki Kaisha, Tokyo, Japan

[*] Notice: The portion of the term of this patent subsequent to Jan. 29, 2008 has been disclaimed.

[21] Appl. No.: 550,021

[22] Filed: Jul. 9, 1990

Related U.S. Application Data

[63] Continuation of Ser. No. 204,728, Jun. 10, 1988, Pat. No. 4,989,109.

[30] Foreign Application Priority Data

Jun. 12, 1987 [JP] Japan .................................. 62-146660

[51] Int. Cl.⁵ .......................... G11B 5/55; G11B 5/56
[52] U.S. Cl. ................................ 360/106; 360/77.02; 360/78.05; 360/109
[58] Field of Search ............ 360/106, 104, 105, 77.01, 360/77.02, 77.16, 78.05

[56] References Cited

U.S. PATENT DOCUMENTS

| | | | |
|---|---|---|---|
| 3,924,268 | 12/1975 | McIntosh et al. | 360/78.05 |
| 4,514,773 | 4/1985 | Süsz | 360/77.16 |
| 4,691,252 | 9/1987 | Okada et al. | 360/78.05 |
| 4,713,707 | 12/1987 | Heizman | 360/106 |
| 4,716,481 | 12/1987 | Tezuka | 360/106 |
| 4,733,315 | 3/1988 | Okuyama et al. | 360/106 |
| 4,747,003 | 5/1988 | Tezuka | 360/106 |
| 4,763,214 | 8/1988 | Shibaike | 360/106 |
| 4,811,139 | 3/1989 | Maeda | 360/77.02 |
| 4,814,908 | 3/1989 | Schmitz | 360/77.02 |
| 4,825,313 | 4/1989 | Moribe et al. | 360/77.02 |

Primary Examiner—David J. Severin
Attorney, Agent, or Firm—Sandler, Greenblum & Bernstein

[57] ABSTRACT

A magnetic disk recording and reproducing apparatus is provided having a carriage which supports a magnetic head moving in radial directions about a magnetic disk which is rotatably supported on a body of the apparatus, a cam which is rotatable about a rotational shaft to control the radial position of the magnetic disk, an intermittent rotation mechanism which intermittently rotates the cam by a predetermined angular displacement, a click gear which drives the cam, a click lever which is provided, on one of its ends, a pawl which can disengageably engage with the click gear in order to restrict the angular position of the click gear, a fine adjustment member which movably supports one end of the click lever, and a driving device for moving the fine adjustment member in order to adjust the angular position of the click gear, in accordance with the track position of the magnetic head relative to the magnetic disk.

32 Claims, 5 Drawing Sheets

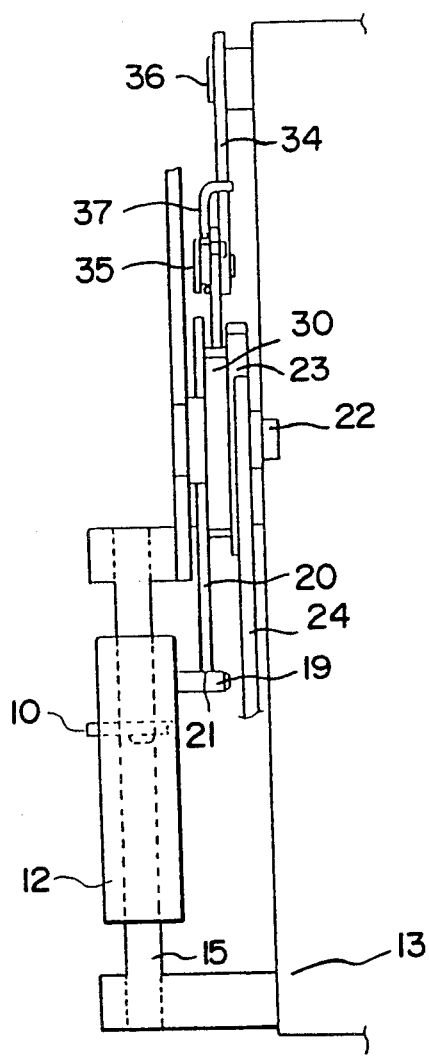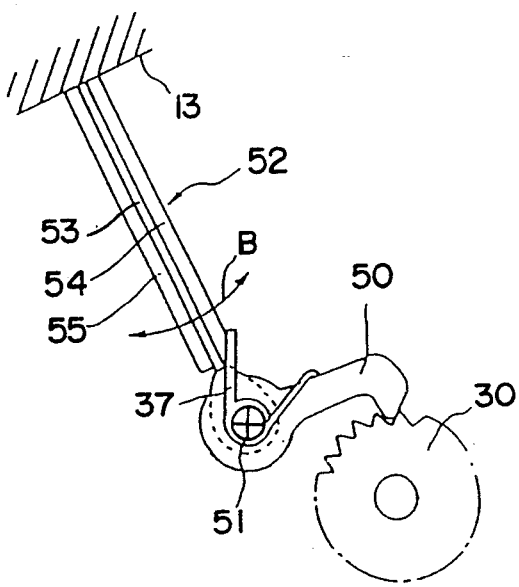
Fig. 2
Fig. 3

METHOD AND APPARATUS FOR ACCURATELY POSITIONING A MAGNETIC RECORDING AND REPRODUCING HEAD

This is a continuation of application Ser. No. 07/204,728 filed June 10, 1988, now U.S. Pat. No. 4,989,109.

BACKGROUND OF THE INVENTION

1. Field of the Invention

The present invention relates to an apparatus for recording and reproducing information on a magnetic disk, and more precisely, to a magnetic disk recording and reproducing apparatus which has a position adjusting servo-mechanism for a magnetic recording and reproducing head in the apparatus.

2. Description of Related Art

In conventional magnetic disk recording and reproducing apparatus, such as an electronic still camera or a floppy disk drive, or a magnetic head is moved in radial directions of the magnetic disk in a stepped fashion by an intermittently moving device, to successively trace a large number of concentric recording tracks.

FIG. 7 shows, in front elevation the internal construction of a known magnetic disk recording and reproducing apparatus.

In FIG. 7, a recording and reproducing magnetic head 10 is secured to a generally L shaped carriage 12 through a piezoelectric element 11. The piezoelectric element 11 comprises a number of laminated piezoelectric plate elements, so that when a voltage is applied between terminal electrodes of the piezoelectric element 11, the latter deforms in thickness l thereof, depending on the polarity and value of the voltage.

A carriage 12 is slidably attached to parallel guide rods 14 and 15 provided on a body 13 of the magnetic recording and reproducing apparatus so as to move the magnetic head 10 along the guide rods. The direction of movement of the carriage 12 corresponds to the direction of movement of the magnetic head 10 which moves above and along the plane of a magnetic disk D, which is supported by a rotational shaft 17 of a magnetic disk driving motor 16, in the radial directions of the magnetic disk. The guide rod 14 is provided with a compression coil spring 18 which is wound around the guide rod 14 to continuously bias the carriage 12 so as to urge the latter far away from the magnetic disk driving motor 16.

Above the carriage 12 in FIG. 7, is a plate cam 20 rotatably mounted to the body 13 through a shaft 22. The plate cam 20 has a peripheral cam surface 21 against which a pin 19, provided on the carriage 12, abuts with the help of the compression coil spring 18. The plate cam 20 has a ratchet gear 23 and a click gear 30 which are both coaxial to the plate cam 20 so as to rotate together.

The ratchet gear 23 is engaged by a pawl 24a which is formed on the front end of a feed lever 24. The feed lever 24 has an elongated hole 24b which is formed at an intermediate portion thereof and which extends substantially in parallel with the guide rod 14. A pin 25, which is provided on the body 13, is fitted in the elongated hole 24b, so that the feed lever 24 can rotate and linearly move. The linear movement of the feed lever 24 is performed by a plunger solenoid 26 which is rotatably connected to the lower end of the feed lever in FIG. 7. The feed lever 24 is continuously biased by a tension spring 27 which is provided between and connected to a pin 13a provided on the body 13 and an arm 24c which is formed on the feed lever 24, so that the ratchet pawl 24a is urged into engagement with the ratchet wheel 23. Thus, when the plunger solenoid 26 is activated with one pulse, one reciprocal movement of the feed lever 24 in the direction parallel with the guide rod 14 takes place to rotate the ratchet wheel 23 by one pitch corresponding to one tooth of the ratchet gear 23 in the clockwise direction in FIG. 7. Numerals 28 and 29 designate stop pins which are provided on the body 13 to restrict the upper and lower terminal ends of the movement of the feed lever 24.

The click gear 30 is engaged by a click pawl 31a which is formed at the front end of a click lever 31 to stop the rotation of the click gear 30 and accordingly, the plate cam 20 at every pitch (tooth) of the click gear 30. The click lever 31 is pivoted at its rear end to a body 13 through a shaft 32 and has a torsion spring 33 provided between the click lever 31 and the body 13 to bias the click lever 31, so that the click pawl 31a comes into engagement with the click gear 30. The click pawl 31a successively comes into the tooth grooves between the tooth threads of the click gear 30 when the click gear 30 rotates in the clockwise direction to intermittently hold the click gear at a predetermined pitch.

The apparatus shown in FIG. 7 operates as follows.

Upon recording and reproducing the magnetic disk D, the plunger solenoid 26 is actuated a predetermined number of times to rotate the plate cam 20 by a predetermined angular displacement in the clockwise direction in order to move the carriage 12, so that the magnetic head 10 is brought into a predetermined position in which the magnetic head 10 is located above a desired track of the magnetic disk D. This position will be referred to as an on-track position. The position of the magnetic head 10 is determined in accordance with the angular position of the plate cam 20, which is restricted by the engagement of the ratchet pawl 24a in the ratchet gear 23.

In the known apparatus mentioned above, the magnetic head can not usually be stopped at a constant and desired position (on-track position) due to mechanical and physical errors of the head actuating mechanism and the magnetic disk, etc., as shown in FIG. 4. In FIG. 4, the abscissa represents the track number, and the ordinate represents the deviation, i.e. the amount of off-track of the magnetic head from a reference position. As shown in FIG. 4, the magnetic head can not be precisely brought into the on-track position, resulting in read errors, especially when a recording and reproducing are performed by different machines.

To eliminate the problem mentioned above, the piezoelectric element 11 serves as a servo-mechanism for adjusting the position of the magnetic head. The piezoelectric element 11 changes in thickness l thereof in accordance with the direction of the current flow and the voltage is provided between the magnetic head 10 and the carriage 12, so as to realize an accurate on track positioning.

However, since the deformation of the piezoelectric element is very small, it is necessary to use a thick and large piezoelectric element in order to provide a sufficient deformation (displacement). This results in a large magnetic disk recording and reproducing apparatus.

It is also possible to increase the number of teeth of the click gear to realize a fine adjustment servo-mechanism of the magnetic head. This solution however, is not desirable, since it is very difficult to manufacture a small click gear having a large number of teeth, and second since it is necessary to increase the diameter of the click gear, resulting in the need to use of a reduction gear.

SUMMARY OF THE INVENTION

The primary object of the present invention is to eliminate the problems of the prior art mentioned above, by providing a small magnetic disk recording and reproducing apparatus having a simple servo-mechanism for adjusting the position of the magnetic head which can accurately stop the magnetic head at a desired on-track position.

To achieve the object mentioned above, according to the present invention, there is provided a magnetic disk recording and reproducing apparatus comprising a carriage that supports a magnetic head moving in radial directions of a magnetic disk which is rotatably supported on a body of the apparatus, a cam which is rotatable about a rotational shaft to control the radial position of the magnetic disk, an intermittent rotation mechanism which intermittently rotates the cam by a predetermined angular displacement, a click gear which drives the cam, a click lever which is provided, on one end, with a pawl which can disengageably engage with the click gear to restrict the angular position of the click gear, a fine adjustment member which movably supports one end of the click lever, and driving means for moving the fine adjustment member to adjust the angular position of the click gear, in accordance with the track position of the magnetic head relative to the magnetic disk.

With this arrangement, the magnetic head can be brought into an accurate on-track position with respect to the tracks of the magnetic disk by a simple adjustment of the click lever.

Preferably, the click lever is rotatable about a pivot shaft at its opposite end, and the fine adjustment member rotatably supports the pivot shaft of the click lever.

Preferably, the fine adjustment member has an adjusting lever which is pivoted at one end to a body of the magnetic disk recording and reproducing apparatus. The pivot shaft of the click lever can be supported by the opposite end of the adjusting lever.

Preferably, the driving means includes a piezoelectric member which is provided between the adjusting lever and the body. The angular position of the adjusting lever can be controlled by the value and polarity of a voltage applied to the piezoelectric member to effect the fine adjustment of the pivot shaft of the click lever.

Preferably, the adjusting lever is biased in the direction of the compression of the piezoelectric member by a spring means. It is possible to give an initial bias to the piezoelectric member to stabilize the position thereof.

The fine adjustment member and the driving means can be embodied by a common bimorph type of piezoelectric element (bimorph cell) which is connected at one end to the body of the apparatus and which supports at the opposite end the pivot shaft of the click lever. The bimorph cell has, as is well known, an elastically deformable metal plate which has on its opposite side faces plate like piezoelectric elements, so that the elastic metal plate can be deformed in opposite directions, depending on the value and polarity of the voltage applied to the plate like piezoelectric elements to perform the fine adjustment of the displacement of the pivot shaft of the click lever.

BRIEF DESCRIPTION OF THE DRAWINGS

The invention will be described below in detail with reference to the accompanying drawings, in which like reference numerals represent similar parts throughout the several views, and wherein:

FIG. 2 is a plan view of FIG. 1;

FIG. 3 is a front elevational view of a click lever and a driving lever according to another aspect of the present invention;

DETAILED DESCRIPTION OF THE INVENTION

Figure 1:
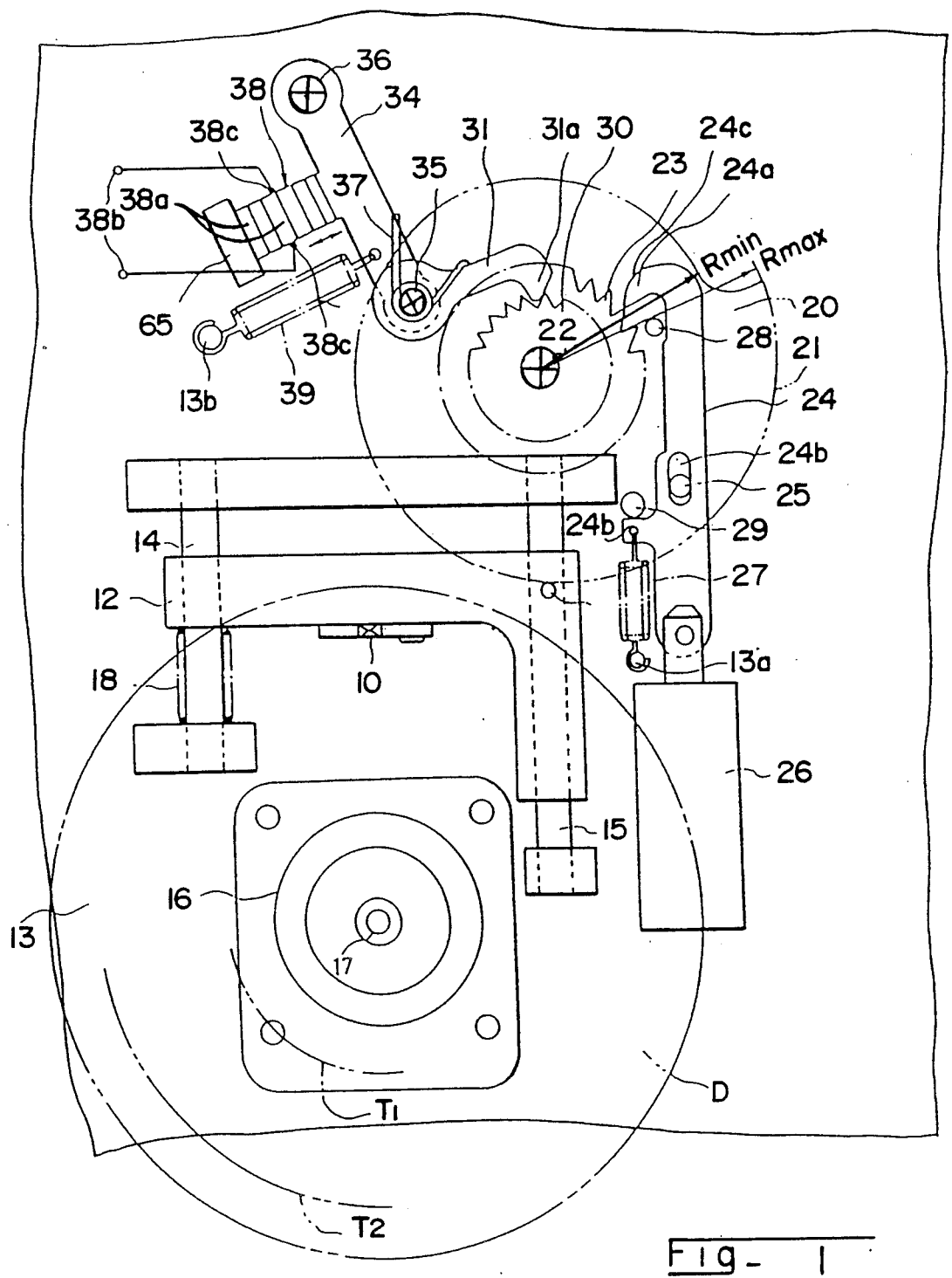
FIG. 1 is a front elevational view of a main part of a magnetic head driving portion of a magnetic disk recording and reproducing apparatus according to one aspect of the present invention.
Figure 7:
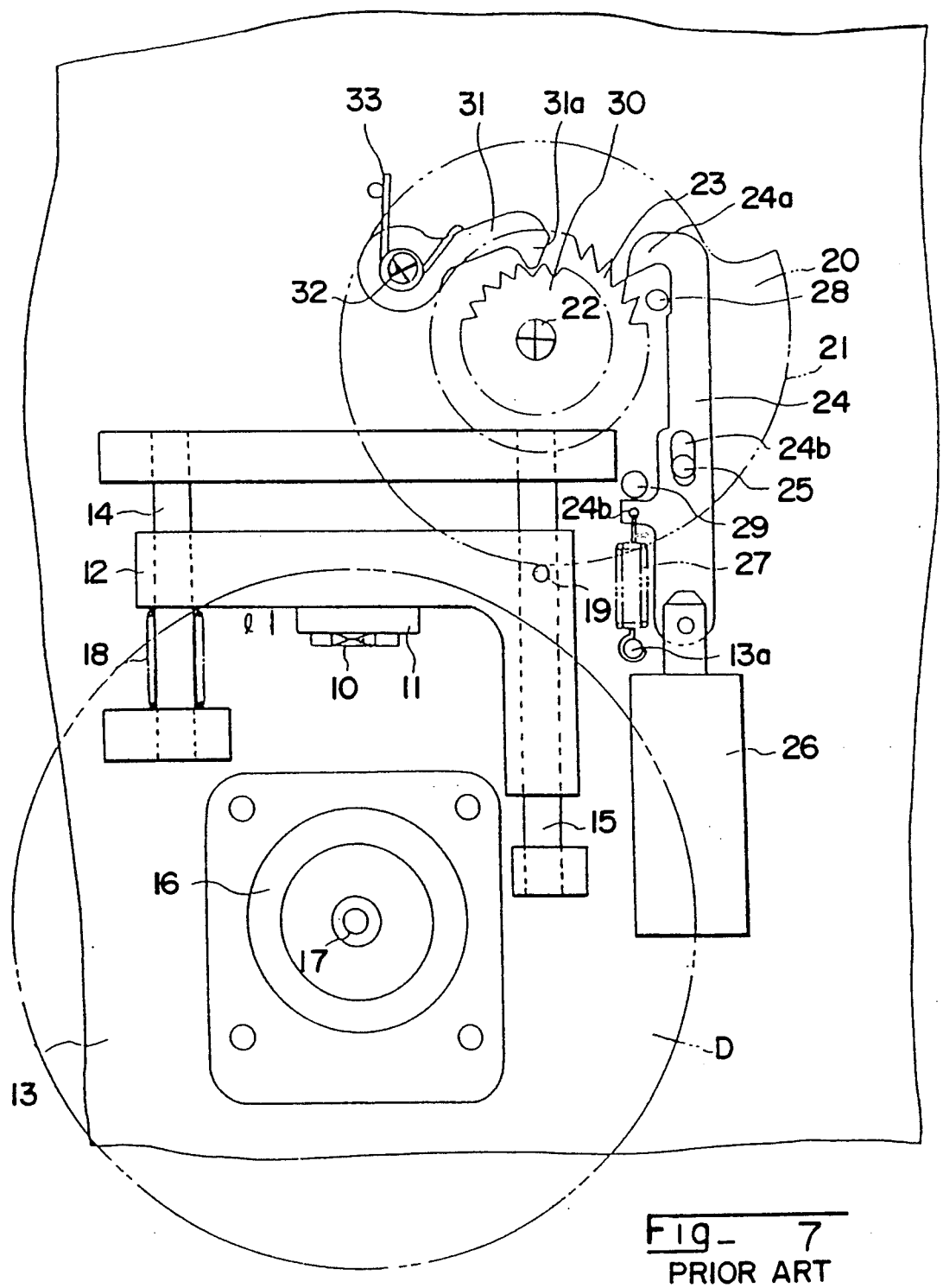

Note that in FIGS. 1 and 2, components corresponding to those in FIG. 7 are designated with the corresponding numerals.

The magnetic recording and reproducing head 10 is directly secured to the generally L-shaped carriage 12. The carriage 12 is slidably mounted to the parallel guide rods 14 and 15 which are provided on the body 13, so that the carriage 12 can move along the guide rods 14 and 15. The magnetic head 10 linearly moves to come away from and close to the rotational shaft 17 of the magnetic disk driving motor 16, in a plane parallel with the magnetic disk D which is supported by the rotational shaft 17.

The carriage 12 is continuously biased by a compression coil spring 18 which is wound around the guide rod 14, so that the magnetic head 10 tends to move away from the magnetic disk driving motor 16.

Above the carriage 12, shown in FIG. 1, is a rotatable plate cam 20 which is rotatable about a shaft 22 on the body 13. The plate cam 20 has a peripheral cam surface 21 against which a pin 19, provided on the carriage 12, is continuously pressed by the spring force of the compression coil spring 18. The plate cam 20 has a ratchet gear (wheel) 23 and a click gear 30 which are both coaxial to the shaft of the plate cam 20 so as to rotate together.

The ratchet gear 23 is engaged by a pawl 24a formed on the front end of a feed lever 24. The feed lever 24 is provided with an elongated hole 24b which is formed at an intermediate portion thereof and which extends substantially in parallel with the guide rod 14. A pin 25 provided on the body 13, is fitted in the elongated hole 24b, so that the feed lever 24 can rotate and linearly move. The linear movement of the feed lever 24 is performed by a plunger solenoid 26, which is pivoted to a lower end thereof in FIG. 1. The feed lever 24 is continuously biased by a tension spring 27 which is provided between and connected to a pin 13a provided on the body 13 and an arm 24c which is formed on the feed lever 24, so that the ratchet pawl 24a is urged into engagement with the ratchet gear 23. Thus, when the plunger solenoid 26 is activated with one pulse, one reciprocal movement of the feed lever 24 in a direction parallel with the guide rod 14 takes place against the spring force of the tension spring 27. Upon the upward movement of the feed lever 24 in FIG. 1, the curved rear surface portion 24c of the ratchet pawl 24a slides and runs on the tooth thread of the ratchet gear 23. On the contrary, when the feed lever 24 moves downward, the pawl 24a comes into engagement with the ratchet gear 23 to rotate the ratchet gear 23 by one pitch corresponding to one tooth of the ratchet gear 23 in the clockwise direction in FIG. 1 with each tooth defining a stop position. Stop pins 28 and 29 are provided on the body 13 to restrict the upper and lower terminal end movement of the feed lever 24.

The click gear 30 is engaged by a click pawl 31a which is formed at the front end of a click lever 31. The click lever 31 is pivoted, at its rear end, to a front end of a fine adjustment lever 34 through a pivot shaft 35. The fine adjustment lever 34 is rotatably connected at its rear end to the body 13 through a shaft 36. A torsion spring 37 is wound around the shaft 35 of the click lever 31 to bias the click lever 31, so that the click pawl 31a continuously comes into engagement with the click gear 30.

Between the fine adjustment lever 34 and a piezoelectric element supporting block 65 provided on the body 13 is a piezoelectric element 38 which is actuated to rotate the fine adjustment lever 34 about the shaft 36. The piezoelectric element 38 comprises of a number of laminated piezoelectric plates 38a, 38a, ..., connected to a voltage supply source (not shown) through terminals 38b. Each plate like piezoelectric element 38a varies in thickness, i.e., each deforms in the direction T of thickness, when the voltage is supplied between end electrodes 38c of the piezoelectric element 38 through the terminals 38b. The variation (deformation) of the thickness depends on the value and the polarity of the voltage to be supplied. The deformation of the piezoelectric element 38 causes the fine adjustment lever 34 to rotate about the shaft 36 by a desired angular displacement correspondiong to the deformation.

A tension spring 39 is positioned between the fine adjustment lever 34 and a pin 13b provided on the body 13 which continuously biases the fine adjustment lever 34 in a direction of the compression of the piezoelectric element 38 to exert an initial bias on the piezoelectric element 38 to thereby to stabilize the position thereof.

As can be understood from the foregoing, the click lever 31 rotates about the shaft 35 to bring the click gear 30 (and accordingly, the plate cam 20) into a predetermined angular position (click stop position). However, when the click gear 30 rotates in the clockwise direction, the click pawl 31a is disengaged from the tooth groove of the click gear 30 in which the click pawl 31a has been engaged and rides on the adjacent tooth and comes into engagement in the adjacent tooth groove to keep the click gear 30 in the engagement. Note that the position in which the click pawl 31a and the click gear 30 are engaged with each other, and accordingly the click stop position of the click gear 30 and the plate cam 20, depends on the position of the shaft 35 which varies in accordance with the rotation of the fine adjustment lever 34 about the shaft 36. Namely, the position of the shaft 35 of the click lever 31 can be adjusted by the piezoelectric element 38 through the fine adjustment lever 34.

The profile of the peripheral cam surface 21 of the plate cam 20 describes an Archimedes' spiral in which a difference between the largest diameter $R_{max}$ and the smallest diameter $R_{min}$ is substantially identical to a difference in radius between the innermost recording track $T_1$ and the outermost recording track $T_2$, of the magnetic disk D. The number of the teeth of the track gear 22 and the click gear 30 is identical to the number of the recording tracks of the magnetic disk D. Therefore, the rotation of the plate cam 20 by an angular displacement corresponding to one tooth of the ratchet gear 23 causes the displacement of the carriage 12 and accordingly the magnetic head 10 corresponding to one recording track.

The magnetic disk recording and reproducing apparatus of the present invention operates as follows.

Upon recording and reproducing the magnetic disk D, the plunger solenoid 26 is actuated by a predetermined number of times to rotate the plate cam 20 by a predetermined angular displacement in the clockwise direction in order to move the carriage 12, so that the magnetic head 10 is brought into a predetermined position (on-track position) in which the magnetic head 10 is located above a desired track of the magnetic disk D.

Figure 4:
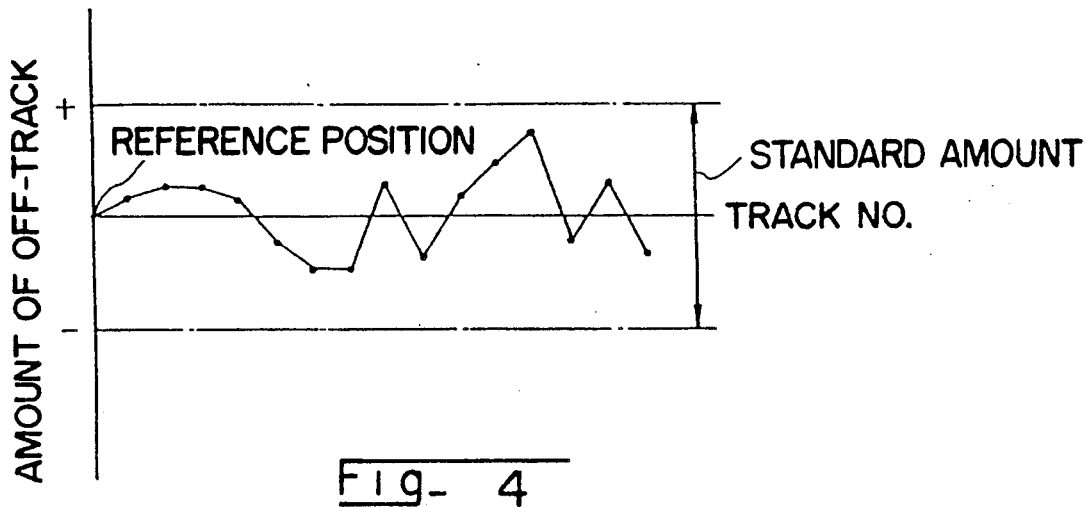
FIG. 4 is a diagram showing the deviation (amount of off-track) of the magnetic head from tracks of the magnetic disk upon recording.

Upon recording, no electric power is supplied to the piezoelectric element 38 and the fine adjustment lever 34 is located at a balance position in which the spring force of the tension spring 39 is balanced with the compression stress of the piezoelectric element 38, so that the angular position of the click gear 30 (plate cam 20) is restricted by the click lever 31. During this recording operation, the magnetic head 10 may be located in the off-track position, i.e. the magnetic head 10 is deviated from the desired recording track, as can be seen in FIG. 4.

Figure 5:
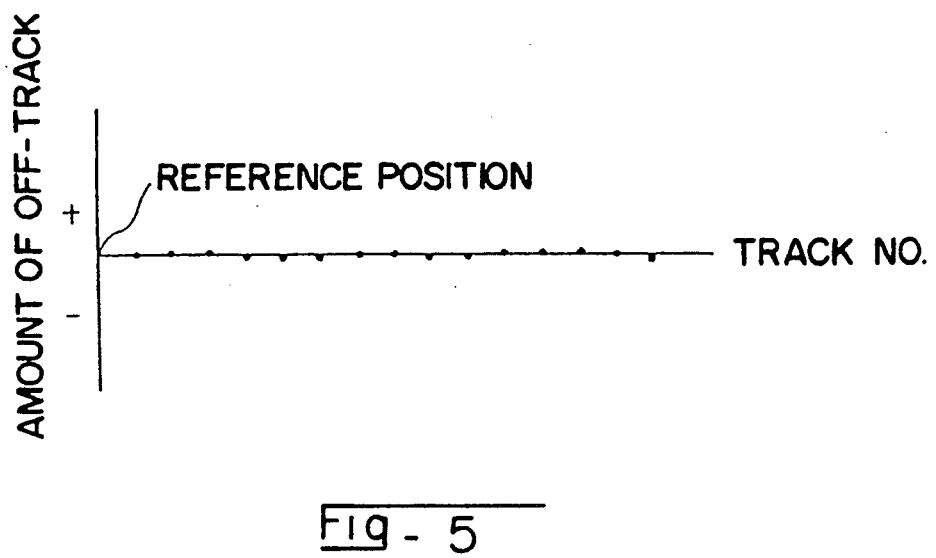
FIG. 5 is a diagram showing the deviation (amount of off-track) of the magnetic head from tracks of the magnetic disk upon recording, according to the present invention.
Figure 6:
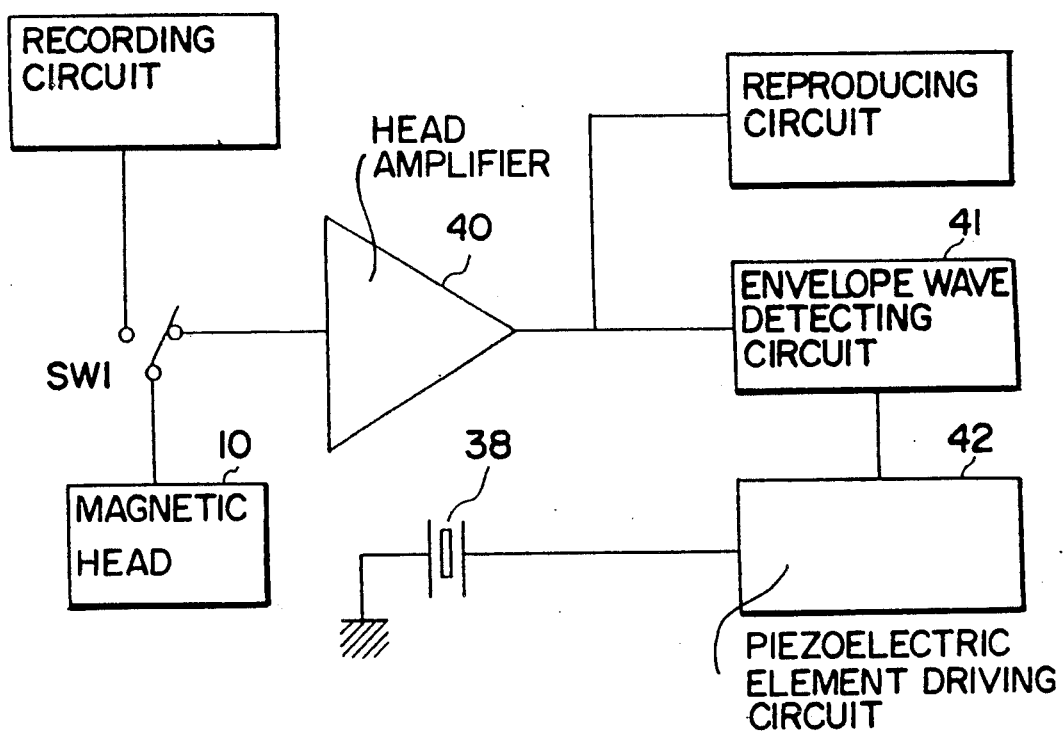
FIG. 6 is a block diagram showing a control circuit according to one aspect of the present invention; and, FIG. 7 is a front elevational view of a main part of a magnetic head driving portion in a known magnetic disk recording and reproducing apparatus.

Referring to FIG. 6, upon reproducing the magnetic disk D, the signal read by the magnetic head 10 is amplified by a head amplifier 40 and is detected by an envelope wave detector 41 to detect the amount of off-track, so that a voltage corresponding to the amount of off-track is applied to the piezoelectric element 38 by a piezoelectric element driving control circuit 42 to compensate for the off-track recording. As a result, the piezoelectric element 38 is deformed to rotate the fine adjustment lever 34 in order to correct the off-track of the magnetic head 10. Consequently, the position of the shaft 35 of the click lever 31 is varied to displace the click pawl 31a, resulting in the rotation of the click gear 30 with which the click pawl 31a engages. Thus, the click stop position (angular position) of the plate cam 20 is varied to realize an accurate on track position of the magnetic head 10 (FIG. 5).

FIG. 3 shows a modified embodiment of the present invention. In this embodiment, both the fine adjustment member of the shaft 51 of the click lever 50 and the driving means thereof are realized by a common bimorph type piezoelectric element 52. The click lever 50 is pivoted to one end (front end) of the bimorph cell 52 which is secured at its opposite end to the body 13 through the shaft 51.

The bimorph cell 52, as is well known, has an elastically deformable metal plate 53 which is provided, on its opposite sides, with plate like piezoelectric elements 54 and 55 secured thereto. When the bimorph cell is activated, one of the piezoelectric elements 54 and 55 stretches and the other contracts, so that the front end of the bimorph cell 52 is elastically deformed in the direction shown by arrows B in FIG. 3. The elastic deformation of the bimorph cell 52 causes the shaft 51 of the click lever 50 to move, so that the click stop position of the plate cam 20 can be varied in a stepped fashion to realize an on-track positioning of the magnetic head 10, similar to the aforementioned embodiment.

I claim:

1. A magnetic disk recording and reproducing apparatus, comprising:

first means for moving a magnetic head to a desired track of a magnetic disk, said first moving means comprising an intermittent rotation mechanism having a rachet gear, said rachet gear being rotated in an intermittent manner, the intermittent rotation of said rachet gear defining rotational stop positions of said rachet gear, the rotational stop positions of said rachet gear grossly positioning said magnetic head with respect to said desired track; and means for determining the position of said magnetic head on said desired track; and second means for moving said magnetic head to finely adjust the rotational stop position of said rachet gear so that said magnetic head moves to said desired track in response to said determining means.

2. The magnetic disk recording and reproducing apparatus of claim 1, wherein said first means comprises a carriage assembly that supports and moves said magnetic head between tracks of said magnetic disk.

3. The magnetic disk recording and reproducing apparatus of claim 1, wherein said second means for moving said magnetic head comprises a piezoelectric element that is deformed by said determining means to move said magnetic head by a small amount to effect a fine position adjustment.

4. The magnetic disk recording and reproducing apparatus of claim 1, wherein said determining means determines the amount of deviation that exists from an on-track position on said desired track of said magnetic disk.

5. The magnetic disk recording and reproducing apparatus of claim 4, wherein said second means for moving said magnetic head comprises a piezoelectric element that is deformed in response to a signal indicating a deviation from the on-track position on said desired track, said deformation causing the rotation of a fine adjustment lever that operates to move said magnetic head over a relatively small distance to the on-track position on said desired track.

6. The apparatus of claim 1, wherein said first and second moving means are independently movable.

7. A magnetic disk recording and reproducing apparatus, comprising:

a carriage which is adapted to support a magnetic head, said magnetic head being adapted to move in radial directions with respect to a magnetic disk which is rotatably supported on a body of said apparatus;

means for moving said carriage so as to place said magnetic head at a desired track on said magnetic disk, said means for moving said carriage comprising an intermittent rotation mechanism having a rachet gear, said rachet gear rotatable in an intermittent manner and defining rotational stop positions of said rachet gear;

means for determining whether said magnetic head positioned at said desired track on said magnetic disk deviates from an on-track position;

a fine adjustment member engageable with said means for moving said carriage; and means for moving said fine adjustment member to adjust the rotational stop position of said rachet gear in response to said determining means to eliminate any deviation from the on-track position that may exist.

8. The magnetic disk recording and reproducing apparatus of claim 7, wherein said means for moving said fine adjustment member comprises a piezoelectric element.

9. The magnetic disk recording and reproducing apparatus of claim 7, wherein said fine adjustment member moving means comprises a bimorph cell having a piezoelectric element secured thereto.

10. The magnetic disk recording and reproducing apparatus of claim 9, wherein said determining means comprises an envelope wave detecting circuit that samples the output of said magnetic head to generate a signal that represents the amount that said magnetic head deviates from the on-track position of said desired track, said signal being used to generate a correcting voltage that corresponds to an amount necessary to cause said bimorph cell to move said magnetic head to the on-track position on said desired track of said magnetic disk.

11. The magnetic disk recording and reproducing apparatus of claim 7, wherein said determining means comprises an envelope wave detecting circuit that samples the output of said magnetic head to generate a signal that represents the amount that said magnetic head deviates from the on-track position on said desired track, said determining means being responsive to said signal.

12. The magnetic disk recording and reproducing apparatus of claim 11, wherein said signal that represents the amount that said magnetic head deviates from the on-track position on said desired track is used to generate a correcting voltage that corresponds to an amount necessary to cause said fine adjustment moving means to move said magnetic head by a small amount to the on-track position on said desired track of said magnetic disk.

13. The magnetic disk recording and reproducing apparatus of claim 11, wherein the output of said magnetic head is amplified prior to said output being inputted to said envelope wave detecting circuit.

14. The magnetic disk recording and reproducing apparatus of claim 11, wherein said means for moving said fine adjustment member comprises a piezoelectric element that functions to perform a fine adjustment of the positioning of said magnetic head so as to eliminate deviations from the on-track position, said piezoelectric element being controlled by said signal that represents the amount that said magnetic head deviates from the on-track position on said desired track.

15. The magnetic disk recording and reproducing apparatus of claim 12, wherein said correcting voltage is applied to a piezoelectric element to compensate for deviations from the on-track position, the application of said correcting voltage to said piezoelectric element causing said piezoelectric element to be deformed to shift said fine adjustment member by a small amount in order to move said magnetic head onto the on-track position on said desired track of said magnetic disk.

16. A method for positioning a magnetic head on a desired track of a magnetic disk, comprising the steps of:

moving the magnetic head with a first magnetic head positioning mechanism to effect a gross placement of the magnetic head onto a desired track of the magnetic disk, said first magnetic head positioning mechanism including an intermittent rotation mechansim having a rachet gear, said rachet gear being rotatable in an intermittent manner to define rotational stop positions of said rachet gear;

analyzing the output of the magnetic head to determine whether the magnetic head position deviates from an on-track position on the desired track of the magnetic disk; and moving the magnetic head with a second magnetic head positioning mechanism in response to the analyzed output of the magnetic head to effect a precise on-track placement of the magnetic head on the desired track of the magnetic disk, said step of moving the magnetic head with a second magnetic head positioning mechanism comprising finely adjusting the rotational stop position of said rachet gear.

17. The method of claim 16, wherein the first magnetic head positioning mechanism comprises a carriage which is adapted to support the magnetic head, the magnetic head being adapted to move in a radial direction with respect to the magnetic disk which rotates, the carriage being moved by an intermittent rotation mechanism that intermittently rotates a cam by a predetermined angular displacement.

18. The method of claim 16, wherein the step of analyzing the output of the magnetic head comprises the steps of:

generating a signal that represents the amount of deviation from the on-track position;

producing a correcting voltage from the on-track deviation signal; and supplying the correcting voltage to the second magnetic head positioning mechanism to effect the on-track placement of the magnetic head on the desired track of the magnetic disk.

19. The method of claim 18, further including the step of amplifying the output of the magnetic head.

20. The method of claim 16, wherein the second magnetic head positioning mechanism comprises a fine adjustment member that movably supports a click lever, the click lever having a pawl at a first end which selectively engages a click gear in order to restrict the angular position of the click gear.

21. The method of claim 20, wherein the fine adjustment mechanism is moved by an electrical voltage applied to a piezoelectric element, the piezoelectric element being deformed by the electrical voltage.

22. A magnetic disk recording and reproducing apparatus, comprising:

a carriage which is adapted to support a magnetic head, said magnetic head being adapted to move in radial directions with respect to a magnetic disk which is rotatably supported on a body of said apparatus;

an intermittent rotation mechanism for grossly positioning said carriage over a predetermined angular displacement, said intermittent rotatable mechanism comprising a ratchet gear, said ratchet gear being rotated in an intermittent manner and defining rotational stop positions of said ratchet gear;

a fine adjustment member engageable with said carriage which finely adjusts the position of said carriage; and driving means for moving said fine adjustment member to finely adjust the position of said carriage;

said driving means for moving said fine adjustment member operative to adjust the rotational stop position of said rachet gear.

23. The apparatus of claim 22, wherein said intermittent rotation mechanism comprises said ratchet gear coaxially supported by a cam, said ratchet gear and said cam being adapted to rotate together, and a feed lever engageable with said ratchet gear and which is movably supported by said body so as to linearly reciprocate in a direction substantially parallel to the direction of movement of said carriage, said lever arranged to rotate said ratchet gear and said cam, said cam operative to position said carriage.

24. The apparatus of claim 22, wherein said fine adjustment member comprises a pivotally mounted click lever and said driving means comprise a bimorph type of piezoelectric element which is connected at one end to said body and which is adapted to support, at an opposite end of said piezoelectric element, the pivot shaft of said click lever, said element adapted to adjustably position said pivot shaft.

25. The apparatus of claim 22, wherein said driving means adjusts the position of pivot shaft of a click lever about the periphery of a click gear.

26. The apparatus of claim 22, wherein said driving means comprises a piezoelectric element which is provided between, and connected to, an adjusting lever and said body.

27. The apparatus of claim 26, wherein said piezoelectric element comprises a plurality of laminated piezoelectric plates.

28. A magnetic disk recording and reproducing apparatus, comprising:

means for moving a magnetic head to a desired track of a magnetic disk, said moving means comprising means for grossly positioning said magnetic head with respect to said desired track, said gross positioning means comprising an intermittent rotation mechanism having a ratchet gear, said ratchet gear being rotatable in an intermittent manner to define rotational stop positions of said ratchet gear;

means for determining the position of said magnetic head on said desired track; and a member that is elastically deformed in response to a signal from said position determining means for moving said magnetic head in a stepped fashion to finely adjust the position of said magnetic head to realize an on-track positioning of said magnetic head on said desired track of said magnetic disk, the elastic deformation of said member being operative to adjust the rotational stop position of said rachet gear to thereby finely adjust the position of said magnetic head.

29. The apparatus of claim 28, wherein said member is connected at one end to a body of said apparatus and which is adapted to support, at an opposite end of said member, a pivot shaft of a click lever.

30. The apparatus of claim 28, wherein said member comprises a bimorph type piezoelectric element.

31. The apparatus of claim 28, wherein said position determining means comprises an envelope wave detecting circuit that samples the output of said magnetic head to generate a signal that represents the amount that said magnetic head deviates from the on-track position on said desired track.

32. The magnetic disk recording and reproducing apparatus of claim 31, wherein said signal that represents the amount that said magnetic head deviates from the on-track position on said desired track is used to generate a correcting voltage that corresponds to an amount necessary to cause said member to move same magnetic head on the on-track position on said desired track of said magnetic disk.

* * * * *

UNITED STATES PATENT AND TRADEMARK OFFICE
CERTIFICATE OF CORRECTION

PATENT NO. : 5,062,019
DATED : October 29, 1991
INVENTOR(S) : Tahei Morisawa

It is certified that error appears in the above-indentified patent and that said Letters Patent is hereby corrected as shown below:

On the Cover, 56/U.S., insert ---4,862,445 8/1989 Sasaki 369/75.2---.
On the Cover, 56/U.S., insert ---4,835,646 5/1989 Kurosawa et al. 360/109---.
On the Cover, 57/abstract, after "engage" delete ---with---.
At column 2, line 14, change "The" to ---A---.
At column 2, line 59, change "on track" to ---on-track---.
At column 3, line 1, after "since" insert ---, first,---.
At column 3, lines 62 and 63, change "opposite side faces plate like" to ---opposite side faceplate like---.
At column 5, line 44, change "correspondiong" to ---corresponding---.
At column 6, line 20, after "actuated" delete ---by---.

Signed and Sealed this

Eighth Day of August, 1995

Attest:

BRUCE LEHMAN

Attesting Officer

Commissioner of Patents and Trademarks